(12) United States Patent
Schofield et al.

(10) Patent No.: US 8,000,601 B2
(45) Date of Patent: Aug. 16, 2011

(54) METHOD AND APPARATUS FOR SECURING FIBER IN AN OPTICAL NETWORK

(75) Inventors: Bruce Schofield, Tyngsboro, MA (US);
Franco Travostino, Arlington, MA (US); Indermohan Monga, Acton, MA (US); Victor FIrolu, Westford, MA (US)

(73) Assignee: Nortel Networks Limited, Mississauga, Ontario (CA)

( * ) Notice: Subject to any disclaimer, the term of this patent is extended or adjusted under 35 U.S.C. 154(b) by 0 days.

(21) Appl. No.: 12/350,333

(22) Filed: Jan. 8, 2009

(65) Prior Publication Data

US 2009/0148159 A1    Jun. 11, 2009

Related U.S. Application Data

(62) Division of application No. 10/891,982, filed on Jul. 15, 2004, now Pat. No. 7,493,040.

(51) Int. Cl.
*H04B 10/12* (2006.01)

(52) U.S. Cl. ......................................... 398/40

(58) Field of Classification Search ............... 398/28, 398/31, 33, 40
See application file for complete search history.

(56) References Cited

U.S. PATENT DOCUMENTS

| 4,207,561 | A | * | 6/1980 | Steensma | 340/600 |
|---|---|---|---|---|---|
| 5,187,362 | A | * | 2/1993 | Keeble | 250/227.15 |
| 6,047,159 | A | * | 4/2000 | Powell et al. | 725/105 |
| H2075 | H | * | 8/2003 | Gnauck et al. | 398/58 |
| 2006/0018475 | A1 | * | 1/2006 | Vig et al. | 380/256 |

* cited by examiner

*Primary Examiner* — Leslie Pascal
(74) *Attorney, Agent, or Firm* — Christopher & Weisberg, P.A.

(57) ABSTRACT

A method and apparatus for securing an optical communication link includes the step of identifying a profile of the link by measuring, at the transmitter, optical back-reflections from optical pulses forwarded to a receiver. The profile is stored at the transmitter. Periodically during operation, such as during key exchange, more optical pulses are forwarded to the receiver, and the back reflections are collected as periodic profiles. The periodic profiles are compared against the stored profiles. Eavesdroppers, such as those who cut the fiber, tap the fiber, or implement a man in the middle attack, may be easily identified because the losses caused by their interference with the fiber will be evident in the periodic profiles.

5 Claims, 7 Drawing Sheets

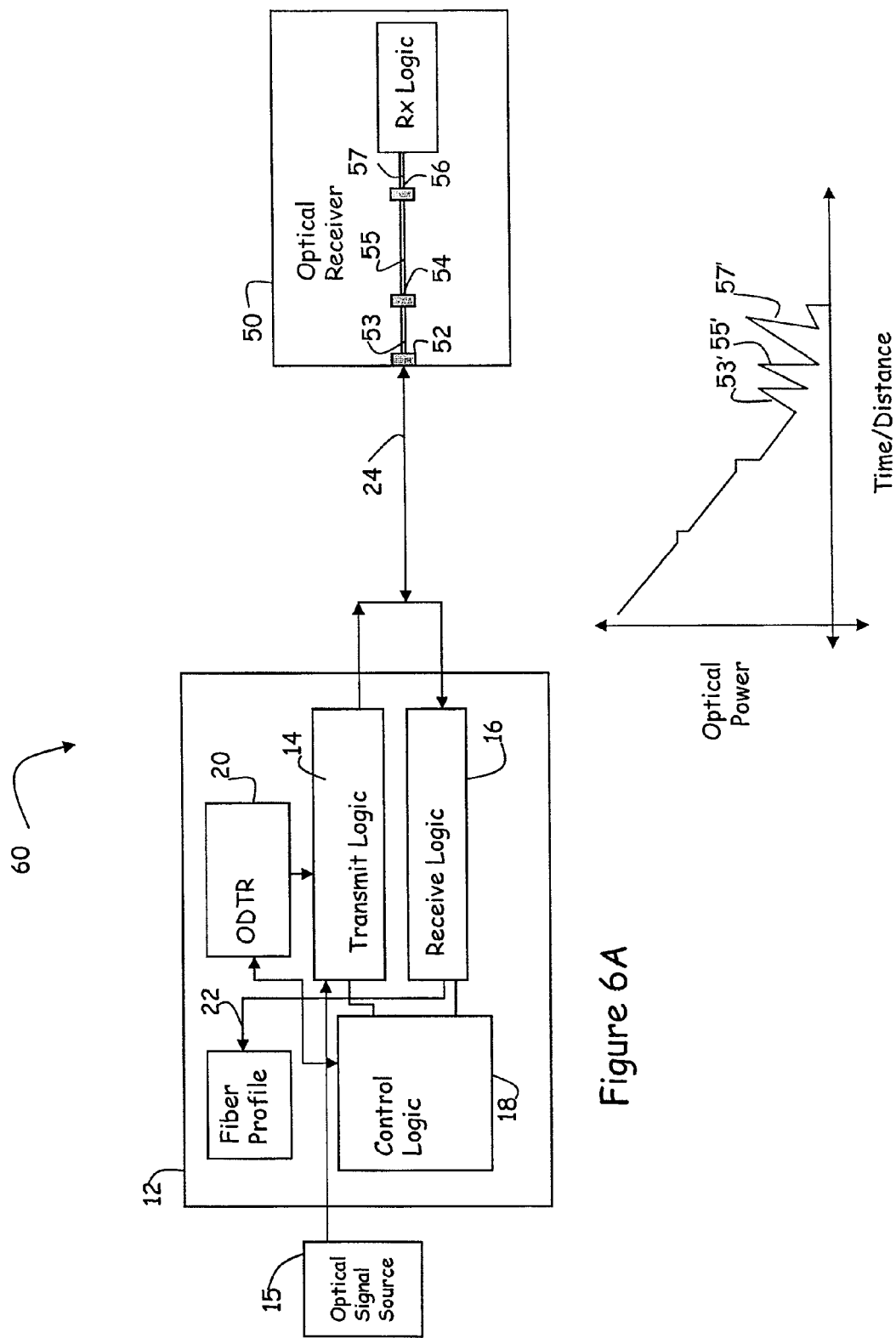

METHOD AND APPARATUS FOR SECURING FIBER IN AN OPTICAL NETWORK

CROSS-REFERENCE OF RELATED APPLICATION

This application is a Divisional of U.S. application Ser. No. 10/891,982, entitled METHOD AND APPARATUS FOR SECURING FIBER IN AN OPTICAL NETWORK, filed Jul. 15, 2004 now U.S. Pat. No. 7,493,040, which is incorporated herein by reference.

FIELD OF THE INVENTION

This invention relates generally to the field of optical networking and more particularly to a method and apparatus for securing an optical communication link.

BACKGROUND OF THE INVENTION

In a networked environment it is frequently desirable to secure communication between two endpoints. Typically the communication is secured by applying security protocols to the packets being exchanged at each of the endpoints. The security protocols are used to authenticate and authorize the individual endpoints, typically using encryption, tunneling or other method of making the packet indiscernible to any other individual which eavesdrops on the link.

Although the security protocols are largely effective, they cannot prevent eavesdropping on the link. Thus rogue devices may still collect packets that are exchanged between the endpoints and store them while attempting to identify the security policies and keys that are used for the communication. There are three basic types of eavesdropping. A rogue individual may simply cut the fiber and impersonate the receiver. In this manner, the sender often cannot detect that it is not communicating with the desired end-point device. Alternatively, the individual may simply tap the fiber, and listen to the data exchanged between the end-points. Such taps are generally undetectable by either end-point, as communication is not disrupted. The third type of eavesdropping is a so-called 'man in the middle' attack. In the man-in-the middle attack, the individual makes a connection between the sender and the receiver. The man-in-the-middle impersonates the receiver; collecting data transmitted from the sender, storing the data, and forwarding it to the receiver. The man-in-the-middle also impersonates the sender for receiver initiated communication. Thus it collects data that is forwarded from the receiver back to the sender. Often the sender and receiver are unaware of the man-in-the-middle as packets still reach the end-points, albeit with some delay. Thus, although security protocols can be used to encrypt packets and make the decode of the packets by eavesdropping devices more difficult, they cannot prevent the packet from landing in the hands of undesired recipients. Such security can only be obtained by securing the physical link, or fiber, between the devices to identify interruptions in the fiber.

On method of detecting intruders on the fiber involves forwarding a single photon down the fiber from a sender to a receiver. If there is a rogue connection on the fiber, the photon will be absorbed at the rogue device, not making it to the receiver. When the sender attempts to verify the receipt of the photon at the receiver, and the receiver indicates that it has not been received, the pair know that the fiber has been compromised.

Similarly, a second of detecting an undesired presence on the fiber involves the sender forwarding two photons that are separated in polarization, and forwarding the photons on a polarization sensitive fiber to the receiver. Any snooping of the photons between the sender and the receiver causes the polarization of the photons to be changed, thus indicating to the sender/receiver pair that the fiber has been compromised. One drawback of such a solution is that it requires the use of polarization maintaining fiber which is expensive and thus increases the overall cost of the communication link.

There are several problems with using the single or double photon transmission methods above to secure the fiber. First, due to the inherent nature of lasers it is often difficult to separate only one or two photons from the lased light source. The second problem arises due to the inherent nature of the fiber; one or two photons can easily be absorbed due to impurities in the fiber, or the photon can escape at some point during transmission. In addition, the solutions are only suitable in environments having relatively short fiber spans, as the inclusion of an amplifier in the path would make the solutions inoperable. Further, because the generation and receipt of a single photon may only be reliably implemented at a relatively low bit rate, users were often limited to the use of key based mechanisms for securing exchanges. Thus, the reliability, robustness and feasibility of these methods is questionable. It would be desirable to identify a more reliable method of securing a fiber.

SUMMARY OF THE INVENTION

According to one aspect of the invention, a method for securing a fiber connecting a sender to a receiver includes the step of generating a light pulse, forwarding the light pulse by the sender to the receiver and receiving reflections of the light pulse at the sender as the light pulse traverses the fiber. The reflections provide a physical profile of the fiber. The physical profile defines the scattering of light as it traverses the fiber. Any discontinuities, connections and/or splices cause points of increased reflection in the fiber. After collection of the initial profile, the light pulse is re-transmitted at periodic intervals during transmissions between the sender and the receiver, and reflections are again collected at the sender, thus providing periodic profiles of the fiber. The periodic profiles are compared against the stored profile. Any deviation in the profile may be used to identify the presence and even the location of a rogue eavesdropper on the fiber. With such an arrangement, a relatively low cost and reliable method of securing the fiber is provided.

According to another aspect of the invention, a method for securing a fiber at a receiver in a communication system includes the steps of receiving an optical pulse over the fiber, the optical pulse having sufficient power to cause back-reflections over the fiber, reflecting the back-reflections over the fiber; and verifying that the optical pulse was forwarded by a permitted transmitter. Optical pulse transmit power is proportional to the power of the reflections; thus increasing the optical transmit power increases the sensitivity of the intrusion detection device of the present invention.

According to a further aspect of the invention, an apparatus for securing communication of a link includes an optical pulse generator for generating an optical pulse for forwarding over the link, the optical pulse having sufficient power to enable back reflections over the link and a table for storing a profile of the link, the profile identifying a change in optical power over time of back reflections of the optical pulse forwarded over the link.

According to another aspect of the invention, a system for securing communication on a link disposed between a transmitter and a receiver includes means for generating an optical pulse for transmission by the transmitter over the link, the optical pulse having sufficient power to provide a back-reflection to the transmitter; and means for tracking the back-reflection over the link to provide a profile of the fiber.

BRIEF DESCRIPTION OF THE DRAWINGS

FIGS. 6A and 6B illustrate the use of jumpers at an optical receiver to provide a distinct link profile, as illustrated in FIG. 6B;

DETAILED DESCRIPTION

Figure 1:
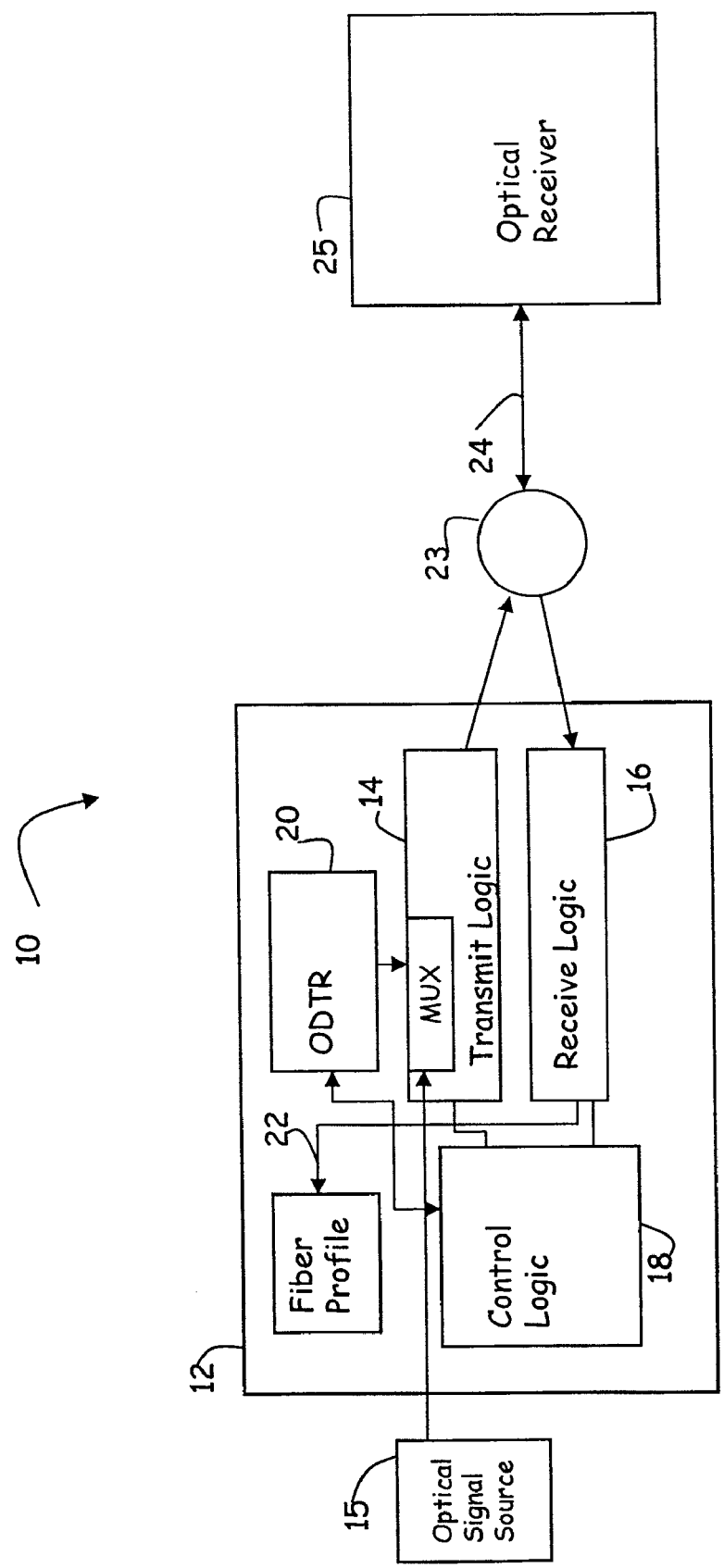
FIG. 1 is a block diagram of a transceiver including components which may be used in the present invention.

Referring now to FIG. 1, an optical connection 10 includes an optical source 15 for generating an optical signal. The optical source can be any mechanism that is used to generate an optical signal, and the present invention is not limited to any particular method of optical signal generation.

The optical signal is transferred to an optical transceiver 12 for forwarding over an optical fiber 24. The optical fiber may be of any type of arrangement of optical fibers that are provided in the industry, for example in existing Wavelength Division Multiplexing (WDM) systems, and the present invention is not limited to any particular type of fiber. Rather, it will be appreciated from the below description that the present invention may be used with any range of fiber quality, from high cost polarization fiber to relatively low cost fiber.

Also coupled to the optical fiber 24 is an optical receiver 25. The optical receiver 25 includes logic for receiving an optical signal and may be one component in any optical network device. According to one aspect of the invention, the optical receiver 25 may include a small spooling of fiber before the connector, or alternatively a series of jumper or other arrangement that physically differentiates one receiver from another, providing a profile for the receiver. As will be described in more detail below, the receiver profile may also be used to verify that the connection fiber link 24 is secured.

The fiber 24 thus forms an uninterrupted connection between the transceiver 12 and the receiver 25. The transceiver 12 includes several components that are used to ensure that the uninterrupted connection is not compromised. Transceiver 12 is shown to include typical transceiver logic including transmit logic 14, receive logic 16. Control logic 18 is coupled to the transmit logic 14 and receive logic 16 for the provision of general purpose control. According to one aspect of the invention, the transceiver 12 also includes an Optical Time Domain Reflectometer (OTDR) 20 and a Fiber profile table 22. The OTDR 20 is shown coupled to the transmit and receive logic, and is an instrument which sends out a series of narrow pulses down the fiber and accurately measures the back-reflection. Typically, a 90 degree beam splitter is positioned such that the return light received on the fiber 24 from the receiver 25 bounces at an angle towards a sensitive receiver. The back-reflection tracks the distance in the fiber versus loss of optical power of the returning pulse. An ODTR transmitted pulse width of 1 nsec provides accuracy of distance of 0.2 meters. The back-reflections may be used to capture three fiber anomalies (losses), Rayleight scattering within the fiber (general decline in optical power versus distance) Fresnal reflection, discontinuity in the index of refraction (a spike up in the energy level due to an air gap usually at the fiber ends or a bad connector) and abrupt loss points (caused by connectors, splices or taps). Loss points of 0.1 db are easily detectable. Large dynamic range receivers can yield accurately of 0.01 db and photon counting can lead to 0.001 db. Typical connector loss range from 0.5 to 0.3 db and splice losses range from 0.3 to 0.1 db. Fiber loss due to scattering is 0.3 to 0.2 db/Km. An ODTR back-reflection image of the fiber can easily be taken and stored and in the Fiber profile table 22. It is noted that although only one fiber link is shown in FIG. 1, a given transceiver may have multiple fiber connections. The fiber table 22 may be used to consolidate storage of each of the profiles for each connection from the transceiver.

Figure 2:
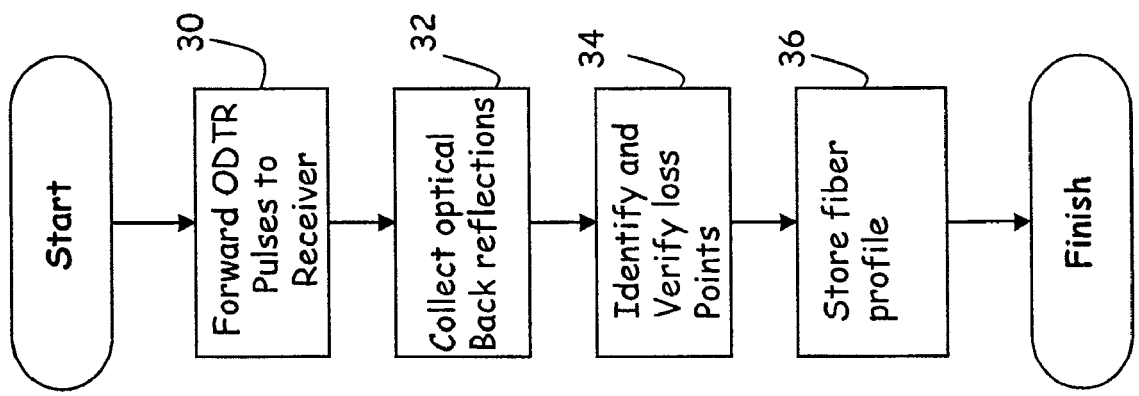
FIG. 2 is a flow diagram illustrating several exemplary steps that may be used to generate a profile of a fiber in the present invention.

Referring now to FIG. 2 exemplary steps that may be performed to identify a profile of a communication link will now be described. At step 30 a series of ODTR pulses are forwarded from a transmitter to a receiver over the link of interest. The ODTR pulses have a selected width and power level. The selection of a width and power level is largely a matter of design choice, and will vary depending upon the link to be evaluated and the capabilities of the receiver. For example, the width of the ODTR pulse should be selected to ensure that the back reflections will adequately indicate the location of impurities or anomalies in the link. For example, a pulse width of 1 nsec provides accuracy of distance of 0.2 meters. The power level of the ODTR pulse should be great enough to ensure that the signal is propagated to the receiver in the presence of losses in the fiber, but not so large that it saturates the receiver.

At step 32 back reflection from the optical pulse are collected at the transmitter. Typically a 90° beam splitter is positioned at the receive logic of the transceiver 12 such that the return light will bounce back at an angle to a sensitive receiver. The back reflections track the distance in the fiber versus loss of optical power of the returning pulse.

Figure 3:
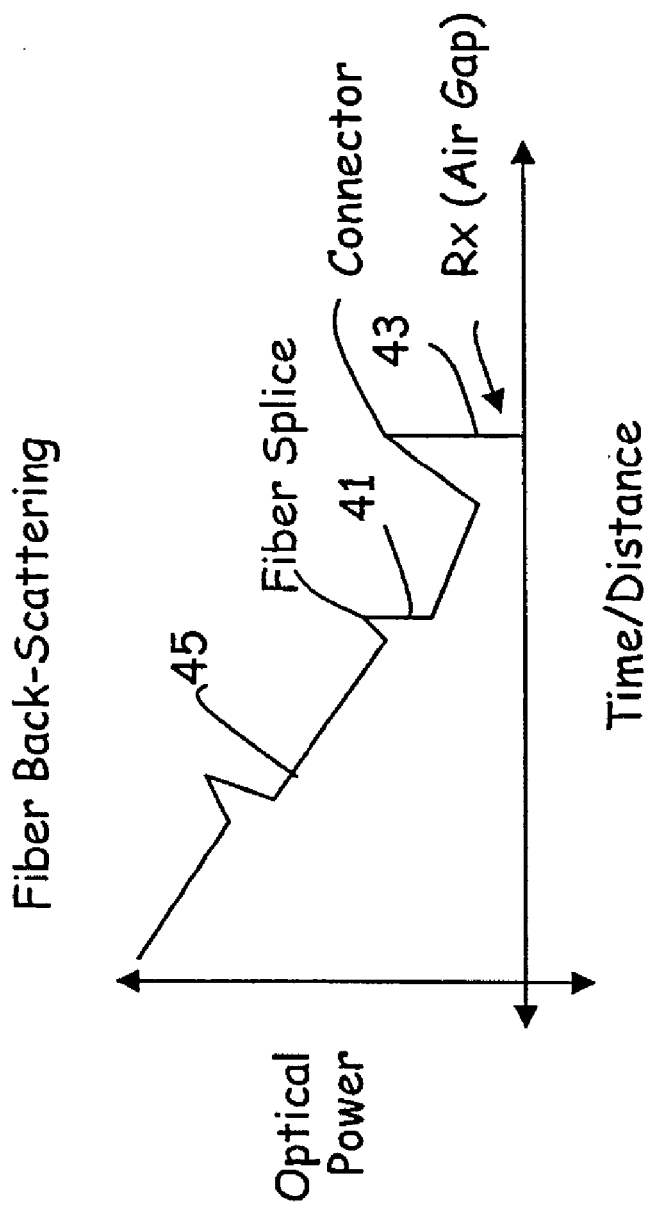
FIG. 3 is a flow diagram illustrating several exemplary steps that may be used to detect a rogue connection on a fiber during transmission of packets between a sender and a receiver using the profile generated using the method of FIG. 2.

Referring briefly to FIG. 3, an exemplary timing diagram illustrating the receipt of back reflection over time at receive logic of a transceiver is shown. The timing diagram graphs the change in optical power over time/distance. A profile 45 reflects the fibers optical power loss over the time period. Various spikes in the profile (such as spike 41) reflect the loss characteristics of the fiber. Thus spike 41 may result from light scattering from a splice, while spike 43 may result from light scattering from a connector. For example, Fiber losses due to scattering result in a power dissipation in the range of 0.3 to 0.2 db/Km. Connector losses range from 0.5 to 0.3 db. Splice losses range from 0.3 to 0.1 db, and will readily be apparent in the profile. Thus, following collection of the back reflections, referring back to FIG. 2 at step 34 the loss points are identified and acknowledged by a trusted installer or inspector of the fiber. at step 36, when the loss points are verified the profile of the fiber is stored in memory.

At this point, an accurate profile of the fiber has been generated and stored. According to one embodiment of the invention, ODTR pulses are continually transmitted over the fiber, with the back reflections being collected as periodic profiles. The periodic profiles are compared against the stored profiles. Any added loss points signal indicate that the security of the fiber has potentially been compromised.

Figure 4:
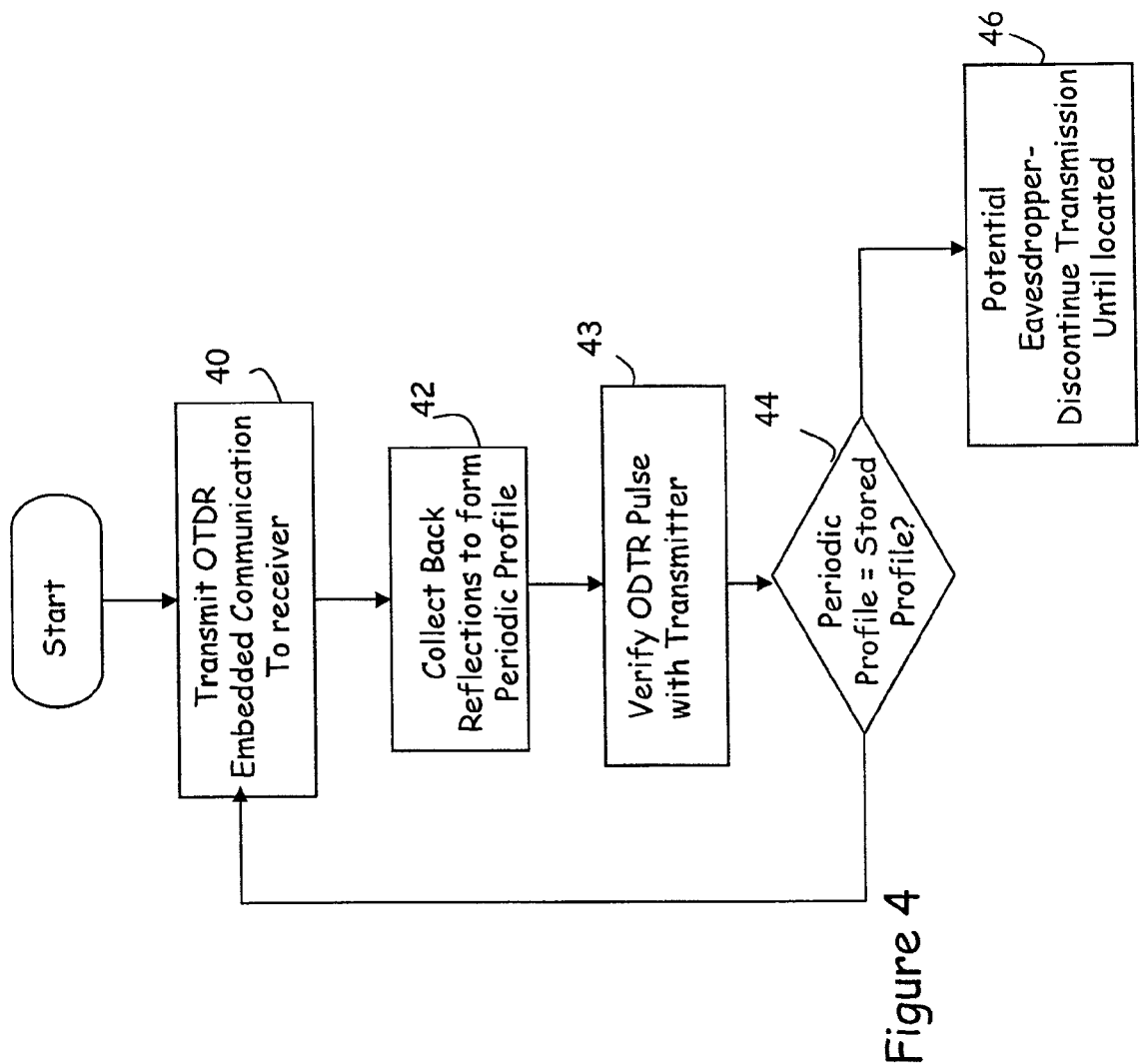
FIG. 4 is provided to illustrate an exemplary profile of an optical fiber.
Figure 5A:
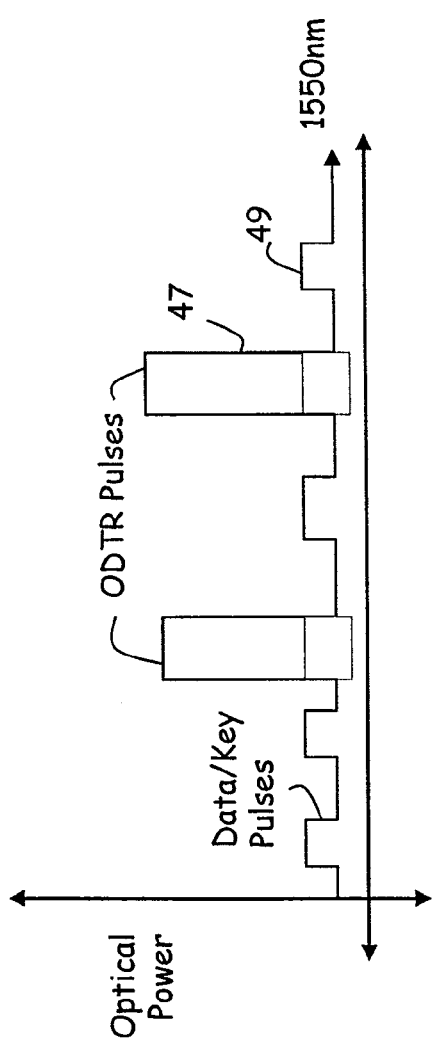
FIGS. 5A and 5B are timing diagrams provided to illustrate various methods of transmitting data pulses having embedded ODTR pulses.

Referring now to FIG. 4, a flow diagram is provided to illustrate several exemplary steps that may be taken during transmission of data over the fiber link to ensure that the security of the link is not compromised. At step 40, data bits having ODTR pulses embedded therein are forwarded to a receiver. Referring briefly to FIG. 5A, in one embodiment, the data signals and ODTR pulses are combined and forwarded at the same frequency to the receiver. The transmission power of the ODTR pulse is greater than the power level used to transmit the data bits, and thus the receiver should have a large dynamic range. In such an embodiment, the separation of the transmission of data bits from the transmission of the ODTR pulses should be large enough to ensure that the saturation effects of the ODTR pulse at the receiver do not cause the data bits to be lost.

Figure 5B:
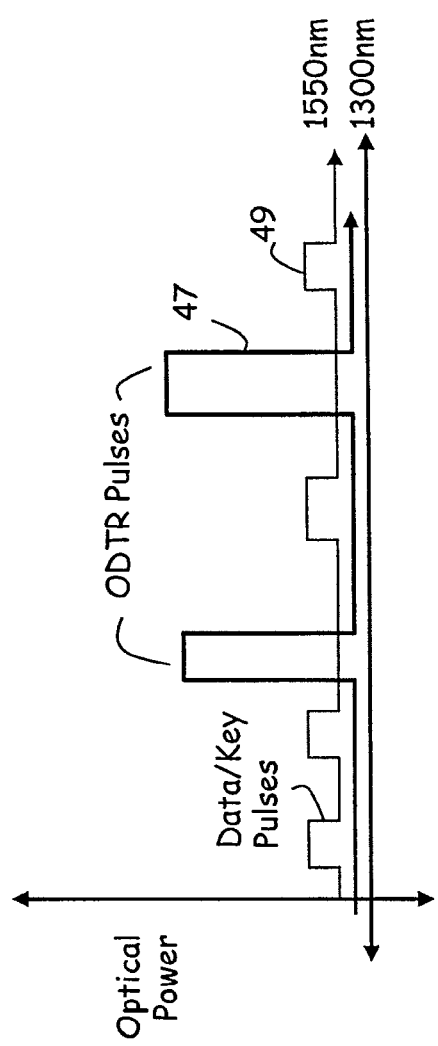

Because receivers having a wide dynamic range are generally expensive, in a second embodiment of the invention, illustrated in FIG. 5B, both the data signals and ODTR pulse signals are transmitted at different frequencies, and combined for transmission over the fiber. A wavelength splitter positioned at the receiver separates the two channels, for example into a 1300 nm ODTR channel and a 1550 nm data channel. The splitter adds an additional discontinuity to the fiber, and is seen as an added spike in the fiber profile.

It should be noted that the ODTR pulses may be embedded in any location of a data stream, in any pattern. In a preferred embodiment, the ODTR pulses are at least embedded in a bit stream when any security information is being forwarded between a transmitter and receiver. The security information may include a key, authentication information, group membership information or other types of information having to do with the network setup and administration. The ODTR pulses may be used to provide bits of the data key, or alternatively may be interpreted as non-data bits at the receiver. Thus it can be appreciated that there are many methods of embedding the ODTR, and the present invention is not limited to any particular arrangement of ODTR bits within a data bit stream.

Referring back to FIG. 4, at step 42 as the ODTR reach the receiver, the back reflections of light travel back over the fiber to the transceiver, and are collected as periodic ODTR profiles. At step 43, for each ODTR pulse received at the receiver, the receiver verifies that the ODTR pulse was sent by the appropriate transmitter via a back channel communication. This verification can be done by having the receiver count the number of ODTR pulses received during an interval (such as during key transmission), and forwarding the number to the transmitter. Other methods may also be used.

At step 44, the periodic profiles are compared against the stored profile. Note that it is not necessary that every periodic profile is compared with the stored profile, provided that enough profiles are compared to ensure that any tap or other discontinuity in the fiber is quickly detected. If at step 44 it is determined that the periodic profile matches the stored profile, then the fiber has not been disturbed and the process returns to step 40. If at step 44 it is determined that there is a mismatch between the periodic profile and the stored profile, then a network administrator is notified of a potential eavesdropper, and secure transmissions over the fiber are discontinued until the problem with the fiber is addressed.

Referring now to FIG. 6A, in an alternate embodiment of the invention, a system may be designed wherein each receiver has a relatively unique and identifiable profile. For example, the receiver 50 is shown to include a series of jumpers 52, 54 and 56, each of which connects additional fiber spans of different lengths. As shown in FIG. 6B, the jumper arrangement results in a corresponding series of spikes in the fiber profile. With this feature, the sender can identify the number of jumpers and the distance between the jumpers (which is reflected in the size of the spike). For example, if a receiver had 4 different length jumpers (i.e., more than 20 cm difference in length), up to sixty-four different receiver profiles could be provided. The arrangement of the jumpers could be periodically changed during operation to further prevent an eavesdropper from modeling itself as a receiver. In such an embodiment, the ODTR pulses and key pulses would be sufficiently spaced to allow the change in jumper sequence to occur at the receiver. The target receiver can share in a public forum the jumper sequence. If the sender detects a different arrangement in the back reflections, it indicates that a potential eavesdropper has cut the fiber, and the transmissions may be discontinued until the problem is identified.

Figure 7A:
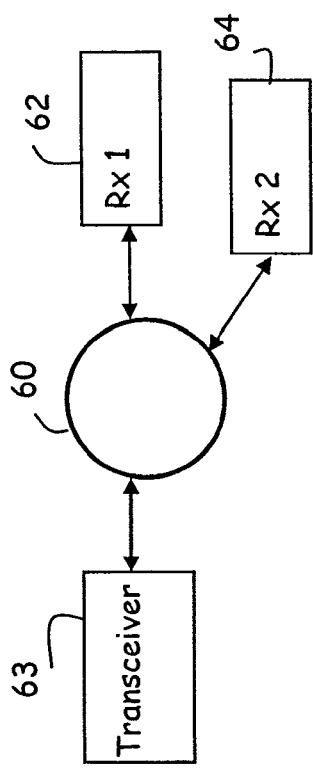
FIGS. 7A and 7B are a block diagram and timing diagram which respectively illustrate a star coupler and associated optical profile for each link coupled to the star coupler, provided to illustrate the use of the present invention to secure links in a star coupled optical network.
Figure 7B:
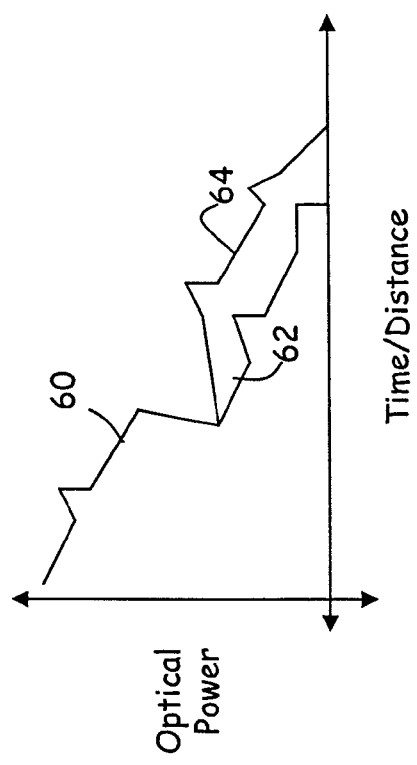

Although the above described embodiments have described the use of the present invention in a point to point communication link, it is appreciated that the invention may also be applied to link arrangements such as the star coupler illustrated in FIG. 7A. In FIG. 7A a transceiver 63 is shown coupled by link 60 to receivers 62 and 64. Although the various connections on the fiber will cause optical power drops as the signals are split at each receiver, an optical profile of the entire system, such as that shown in FIG. 7B, could be maintained at the transceiver. As in the above embodiments, the receivers may have different jumper sequences, and periodically generated profiles could be frequently compared against the stored profile to detect intrusion in the network.

Thus several low cost method and apparatus have been shown and described with facilitate the detection of an eavesdropper on a fiber link. A cut fiber may easily be detected using the concepts of the invention, because a change of fiber length by more than 20 cm is detectable as a back reflection When the receiver profile does not match the target receivers jumper sequence, transmissions are terminated. Thus taps, splices and any other connectivity issues can be readily detected. A man-in-the-middle attack could be attempted if an eavesdropper cuts the fiber and adds enough length to the fiber to match the target receiver's original length. The change in link distance and connector profiles caused in a man-in-the-middle attack will be readily apparent in the change in profile. The eavesdropper could also guess at the receiver's profile and repeat the signal to the target receiver. However, similar to the man-in-the-middle attack, the fiber profile change and connector profile change will be quickly detected. Thus, with the present invention this type of attack is always detectable because of the difficulty in guessing the exact length of the receiver's fiber within 20 cm without the use of an ODTR pulse. By having the target receiver verifying that the ODTR pulse is forwarded by the transmitter, a rogue ODTR pulse is easily detected. In an embodiment wherein the receiver periodically alters its jumper profile, an eavesdropper could not keep up with the changing profiles, and would quickly be detected.

Eavesdroppers that seek to simply tap off some light from the fiber could also be easily detected using the present invention, because the amount of power that would be required for the eavesdropper to adequately overhear the signal, and thus that would be lost by the tap, would be readily identifiable in the ODTR profile. In addition, the amount of power that would be lost in the tap would degrade the performance of the optical receiver to such an extent that a Bit-Error-Rate desired for key exchange at the receiver could not be achieved.

Accordingly several embodiments of a method an apparatus for securing a fiber against eavesdropper have been provided. The above description and figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software or a combination thereof. For example the profile table of FIG. 1 may be implemented as hardware storage devices or may represent data elements stored in a data structure.

FIGS. 2 and 4 are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A method for securing a fiber at a receiver in a communication system includes the steps of:
   receiving an optical pulse over the fiber, the optical pulse having sufficient power to cause back-reflections over the fiber;
   reflecting the back-reflections over the fiber; and
   verifying during a given event that optical pulses were forwarded by a permitted transmitter by counting a number of optical pulses from one of the received optical pulse and the reflected back-reflections; and
   forwarding an indication of the counted number of optical pulses to the permitted transmitter.

2. The method of claim 1, wherein the given event is a key exchange.

3. The method of claim 1, wherein the given event is a predetermined time interval.

4. The method of claim 1, further including the step of periodically modifying a design at the receiver.

5. The method of claim 4, wherein the step of periodically modifying the design includes changing an arrangement of jumpers at the receiver.

* * * * *